(12) United States Patent
Hagiwara

(10) Patent No.: US 12,214,415 B2
(45) Date of Patent: Feb. 4, 2025

(54) DYNAMIC LOAD MEASUREMENT METHOD FOR ROTARY FORGING DEVICE, DYNAMIC LOAD MEASURING DEVICE, METHOD FOR CALIBRATING ROTARY FORGING DEVICE, METHOD FOR MANUFACTURING HUB UNIT BEARING, AND METHOD FOR MANUFACTURING VEHICLE

(71) Applicant: NSK LTD., Tokyo (JP)

(72) Inventor: Nobuyuki Hagiwara, Fujisawa (JP)

(73) Assignee: NSK LTD., Tokyo (JP)

( * ) Notice: Subject to any disclaimer, the term of this patent is extended or adjusted under 35 U.S.C. 154(b) by 254 days.

(21) Appl. No.: 16/968,755

(22) PCT Filed: Feb. 13, 2019

(86) PCT No.: PCT/JP2019/005060
§ 371 (c)(1),
(2) Date: Aug. 10, 2020

(87) PCT Pub. No.: WO2019/159955
PCT Pub. Date: Aug. 22, 2019

(65) Prior Publication Data
US 2020/0406338 A1 Dec. 31, 2020

(30) Foreign Application Priority Data
Feb. 13, 2018 (JP) .................. 2018-023141

(51) Int. Cl.
*B21J 9/02* (2006.01)
*B21K 25/00* (2006.01)
(Continued)

(52) U.S. Cl.
CPC ............... *B21J 9/025* (2013.01); *B21K 25/00* (2013.01); *F16C 19/18* (2013.01); *F16C 29/0602* (2013.01)

(58) Field of Classification Search
CPC ....... B21J 9/025; B21J 9/00; B21J 9/02; B21J 9/20; B21J 9/10; B21K 1/28; B21K 1/32; B21K 1/38; B21K 1/40
(Continued)

(56) References Cited

U.S. PATENT DOCUMENTS 5,911,458 A * 6/1999 Bywalez ............... F16C 19/185
29/898.07
6,363,799 B1 * 4/2002 Toda ....................... F16C 43/04
73/862.392
(Continued)

FOREIGN PATENT DOCUMENTS

CN 103608136 A 2/2014
CN 109416241 A 3/2019
(Continued)

OTHER PUBLICATIONS

Communication dated Nov. 26, 2021 from the Chinese Patent Office in Chinese Application No. 201980018152.5.
(Continued)

*Primary Examiner* — Christopher L Templeton
*Assistant Examiner* — P Derek Pressley
(74) *Attorney, Agent, or Firm* — Sughrue Mion, PLLC

(57) ABSTRACT

A measuring pressing die (43) is supported by a spherical concave seat (12). A measuring shaft member (45) is disposed coaxially with a reference axis (α) and is linearly guided in a direction of the reference axis (α) between the measuring pressing die (43) and a support table (16). After that, the load application apparatus measures an actual load in the direction of the reference axis (α) applied to the
(Continued)

measuring shaft member (45) using a load cell (48) in a state in which the measuring pressing die (43) is pressed against the measuring shaft member (45) while the measuring pressing die (43) is rotated about the reference axis ($\alpha$).

12 Claims, 8 Drawing Sheets

(51) Int. Cl.
    *F16C 19/18*     (2006.01)
    *F16C 29/06*     (2006.01)

(58) Field of Classification Search
    USPC .................................................... 72/67–126
    See application file for complete search history.

(56) References Cited

U.S. PATENT DOCUMENTS

| | | | |
|---|---|---|---|
| 8,631,581 B2 * | 1/2014 | Sera | B60B 35/128 |
| | | | 29/894.362 |
| 2006/0000089 A1 * | 1/2006 | Habedank | F01D 5/286 |
| | | | 416/168 A |
| 2008/0156058 A1 * | 7/2008 | Lin | B21J 5/12 |
| | | | 72/216 |
| 2009/0045670 A1 * | 2/2009 | Enomoto | F16C 43/04 |
| | | | 301/109 |
| 2014/0100044 A1 | 4/2014 | Kimura et al. | |
| 2016/0263940 A1 * | 9/2016 | Hagiwara | F16C 43/04 |

FOREIGN PATENT DOCUMENTS

| | | | | |
|---|---|---|---|---|
| JP | 50-48841 U | | 5/1975 | |
| JP | 2519610 B2 | | 7/1996 | |
| JP | 2002303332 A | * | 10/2002 | .......... F16C 35/0635 |
| JP | 2008-87032 A | | 4/2008 | |
| JP | 4127266 B2 | | 7/2008 | |
| JP | 2008240963 A | * | 10/2008 | ............. F16C 43/04 |
| JP | 201391067 A | * | 5/2013 | |
| JP | 2013091067 A | * | 5/2013 | |
| JP | 2013107096 A | * | 6/2013 | |
| JP | 2015-77616 A | | 4/2015 | |
| JP | 5716917 B2 | | 5/2015 | |
| JP | 2015155112 A | * | 8/2015 | ................ B21J 5/00 |
| JP | 2016-11440 A | | 1/2016 | |
| JP | 6332572 B1 | | 5/2018 | |
| JP | 6566167 B2 | | 8/2019 | |
| WO | WO-2012172942 A1 | * | 12/2012 | ............... B21H 5/02 |
| WO | 2018/012500 A1 | | 1/2018 | |

OTHER PUBLICATIONS

International Search Report for PCT/JP2019/005060 dated, Mar. 19, 2019 (PCT/ISA/210).

Notice of Allowance issued Nov. 1, 2022 in Japanese Application No. 2019-133018.

* cited by examiner

DYNAMIC LOAD MEASUREMENT METHOD FOR ROTARY FORGING DEVICE, DYNAMIC LOAD MEASURING DEVICE, METHOD FOR CALIBRATING ROTARY FORGING DEVICE, METHOD FOR MANUFACTURING HUB UNIT BEARING, AND METHOD FOR MANUFACTURING VEHICLE

CROSS REFERENCE TO RELATED APPLICATIONS

This application is a National Stage of International Application No. PCT/JP2019/005060 filed Feb. 13, 2019, claiming priority based on Japanese Patent Application No. 2018-023141, filed Feb. 13, 2018.

TECHNICAL FIELD

The present invention relates to a technique for calibrating a load of a rotary forging device.

Priority is claimed on Japanese Patent Application No. 2018-023141, filed Feb. 13, 2018, the content of which is incorporated herein by reference.

BACKGROUND ART

The wheels of a car are supported by, for example, a hub unit bearing 1 as shown in FIG. 8 to be rotatable with respect to a suspension device. The hub unit bearing 1 includes an outer ring 2 which does not rotate in a state of being joined and fixed to a suspension device of a vehicle such as a car, a hub 3 which rotates with a wheel while supporting and fixing the wheel, and a plurality of rolling elements 6 disposed between a plurality of rows of outer ring trajectories 4a and 4b provided on an inner circumferential surface of the outer ring 2 and a plurality of rows of inner ring trajectories 5a and 5b provided on an outer circumferential surface of the hub 3.

The hub 3 is formed by joining and fixing a hub ring 7 having the inner ring trajectory 5a outward in an axial direction (a left side in FIG. 8) formed on an outer circumferential surface thereof to an inner ring 8 having the inner ring trajectory 5b inward in the axial direction (a right side in FIG. 8) formed on the outer circumferential surface thereof. To be specific, in order to constitute such a hub 3, in a state in which the inner ring 8 is externally fitted into an axially inner portion of the hub ring 7, an axially inner end surface of the inner ring 8 is held by the caulking part 10 formed by plastically deforming (caulking and expanding), outward in the radial direction, a portion protruding further inward in the axial direction than the inner ring 8 in the cylindrical part 9 provided on the axially inner portion of the hub ring 7. A pre-pressure of the hub unit hearing 1 is increased due to an axial force applied from the caulking pan 10 to the inner ring 8. Furthermore, the pre-pressure increased in this way is managed such that it falls within an appropriate range.

When the hub unit bearing 1 is manufactured, the work of forming the caulking part 10 from the cylindrical part 9 can be performed using a rotary forging device which is described in Japanese Patent No 4127266 (Patent Document 1), Japanese Patent Application, Publication No. 2015-77616 (Patent Document 2), and the like and is known in the related art.

A rotary forging device includes a pressing die and a support table configured to support a hub ring 7. The pressing die is rotatable (swingingly rotatable) about a reference axis and freely rotates about an axis of rotation inclined at a predetermined angle with respect to the reference axis. When the hub unit bearing 1 is manufactured, the caulking part 10 is formed by pressing the swingingly rotating pressing die against the cylindrical part 9 in a state in which a central axis of the hub ring 7 is aligned with a reference axis.

Also, the rotary forging device includes a load application apparatus for applying a load in a direction of the reference axis to the cylindrical pan 9 (the caulking part 10) by pressing the swingingly rotating pressing die against the cylindrical part 9 (the caulking part 10). When the hub unit bearing 1 is manufactured, the caulking part 10 is finished into a desired shape by controlling a load applied by the load application apparatus and a pre-pressure within an appropriate range is applied to the hub unit bearing 1.

CITATION LIST

Patent Literature

Patent Document 1

Japanese Patent No. 4127266

Patent Document 2

Japanese Patent Application Publication No. 2015-77616

SUMMARY OF INVENTION

Technical Problem

In a rotary forging device, when a set value of a load of a load application apparatus (a value of a load in a direction of a reference axis recognized when a load application apparatus is applied to an object to be pressed) deviates from a value of a load (an actual load) in the direction of the reference axis actually applied to the object to be pressed, it is impossible to perform high precision processing. When the above-described hub unit bearing 1 is provided as an example, it is difficult to finish the caulking part 10 into a desired shape and apply an appropriate range of pre-pressure to a hub unit bearing 1.

Therefore, in the rotary corning device, it necessary to calibrate a set value of a load of a load application apparatus at the time of shipment, maintenance, and the like and to cause the set value to match an actual load in a direction of a reference axis applied to an object to be pressed.

Here, during an operation of the rotary forging device, the actual load in the direction of the reference axis applied to the object to be pressed is an actual load in a state in which the pressing die is swung and rotated. For this reason, when the set value of the load of the load application apparatus is calibrated, it is desirable to perform dynamic load measurement in which an actual load is measured while the pressing die is swingingly rotated and perform the calibration using the measured actual load.

However, in a dynamic load measurement method which is known in the related art, that is, a dynamic load measurement method in which a pressing die is directly pressed against a load cell while swingingly rotated, there is a problem that an offset load is applied to the load cell and a is difficult to measure an actual load in the direction of the reference axis with high accuracy. Particularly, when a swing angle of a pressing die (an angle of an axis of rotation with respect to the reference axis) is a relatively large angle, the effect of the offset load increases and it is more difficult to measure the actual load in the direction of the reference axis with high accuracy. Therefore, in the related art, an actual load in a direction of a reference axis has been measured using static load measurement in which the pressing die is directly pressed against the load cell while stopped and a set value of a load of a load application apparatus has been calibrated using the measured actual load. However, in such a calibration method, unlike the calibration method using the actual load measured by dynamic load measurement, calibration cannot be performed in accordance with the actual situation. Thus, there is a problem that it is difficult to sufficiently ensure the reliability of calibration.

An objective of the present invention is to provide an apparatus for measuring an actual load in a direction of a reference axis applied to an object to be pressed in a state in which a pressing die is pressed against the object to be pressed while swingingly rotated.

Solution to Problem

In an aspect of the present invention, a rotary forging device includes a pressing die support part, a support table, and a load application apparatus. The pressing die support part is capable of supporting any one selected from a forming pressing die and a measuring pressing die to be rotatable about a reference axis and to freely rotate about an axis of rotation inclined at a predetermined angle with respect to the reference axis. The support table is configured to support an object to be pressed disposed at a position facing a pressing die supported by the pressing die support part in a direction of the reference axis. The load application apparatus is configured to apply a load in the direction of the reference axis to the object to be pressed by pressing the pressing die supported by the pressing die support part against the object to be pressed supported by the support table on the basis of relative movement of the pressing die support part and the support table in the direction of the reference axis.

In another aspect of the present invention, in a dynamic load measurement method for a rotary forging device, the measuring pressing die is supported by the pressing die support part. Furthermore, a measuring shaft member that is an object to be pressed is disposed coaxially with the reference axis and is linearly guided in the direction of the reference axis while supported by the support table. After that, the load application apparatus measures an actual load in the direction of the reference axis applied to the measuring shaft member using a load cell in a state in which the measuring pressing die is pressed against the measuring shaft member while the measuring pressing die is rotated about the reference axis.

In another aspect of the present invention, a dynamic load measuring device for a rotary forging device includes the measuring pressing die, the measuring shaft member, and the load measurement apparatus. The measuring pressing die is supported by the pressing die support part. The measuring shaft member that is an object to be pressed is disposed coaxially with the reference axis and linearly guided in the direction of the reference axis while supported by the support table. The load measurement apparatus is configured to measure an actual load in the direction of the reference axis applied to the measuring shaft member.

In another aspect of the present invention, a method for calibrating a rotary forging device includes measuring the actual load using the dynamic load measurement method for a rotary forging device and calibrating a set value of a load of the load application apparatus using the measured actual load.

In another aspect of the present invention, a hub unit bearing that is a target of a manufacturing method includes a constituent element having a caulking part. A method for manufacturing a hub unit bearing includes forming the caulking part using a rotary forging device calibrated using the method for calibrating the rotary forging device of the present invention.

In another aspect of the present invention, a vehicle that is a target of a manufacturing method includes a hub unit bearing. In a method for manufacturing a vehicle, the hub unit bearing is manufactured using the method for manufacturing a hub unit bearing of the present invention.

Advantageous Effects of Invention

According to an aspect of the present invention, it is possible to measure an actual load applied to an object to be pressed in a direction of a reference axis in a state in which a pressing die is pressed against the object to be pressed while being swung and rotated.

Figure 3:
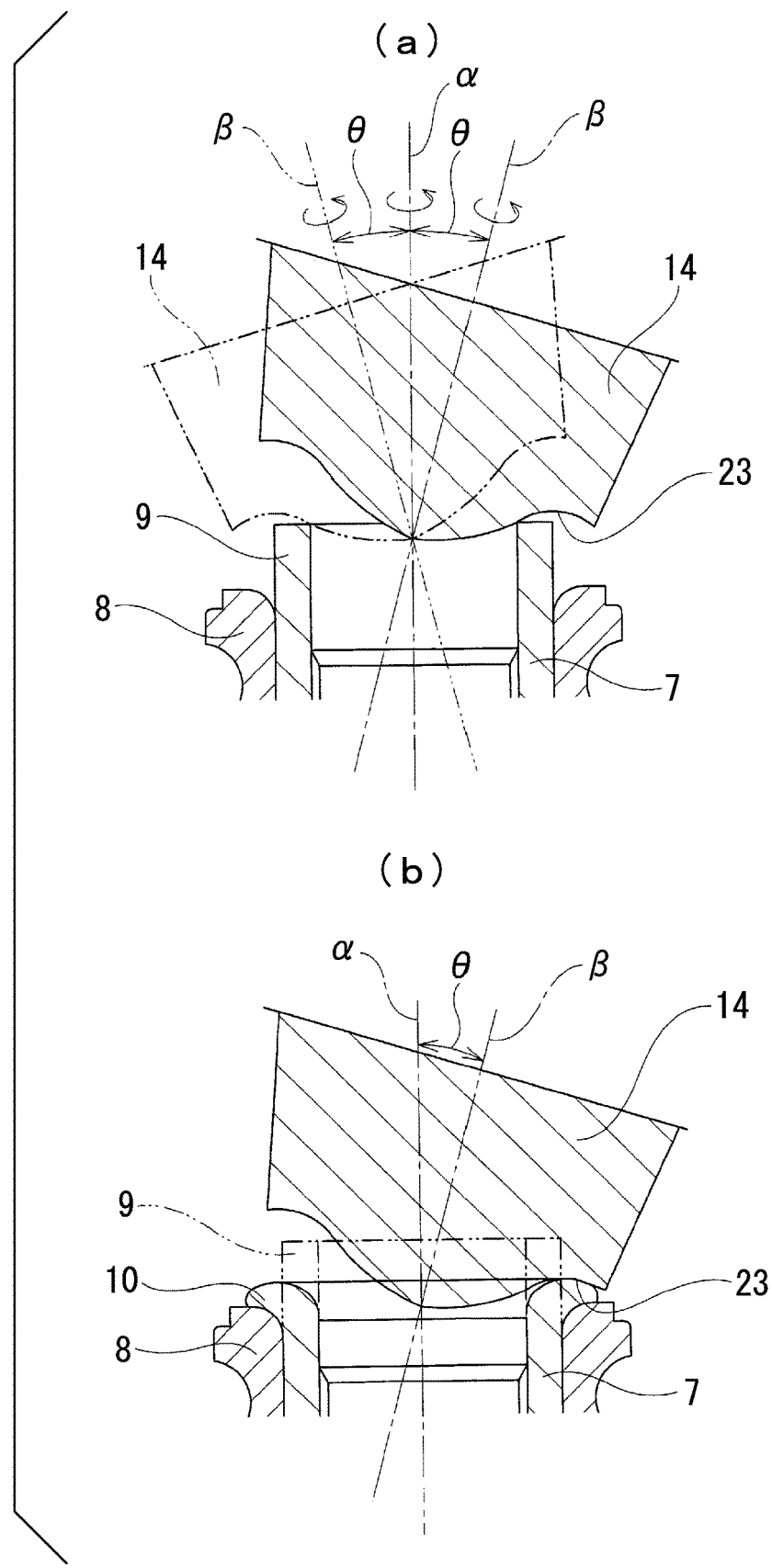

Part (a) and part (b) in FIG. 3 are partially enlarged cross-sectional views showing an operation of forming a caulking part in an order of steps using a rotary forging device according to one example of embodiments of the present invention.

Figure 4:
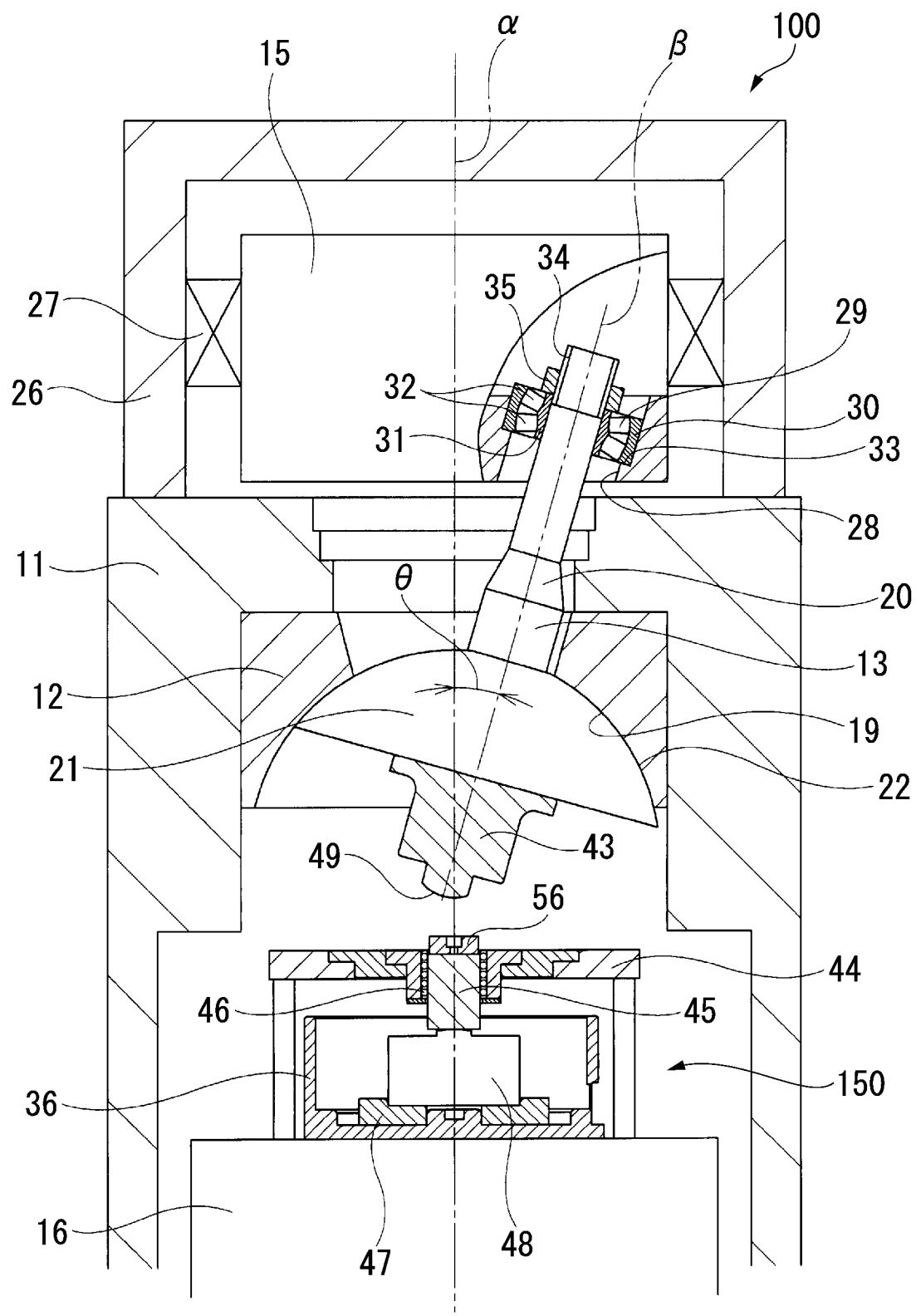

FIG. 4 is a cross-sectional view in a state before a dynamic load measuring device is assembled to the rotary forging device and a measuring pressing die is pressed against an upper end surface of a measuring shaft member according to one example of embodiments of the present invention.

Figure 5:
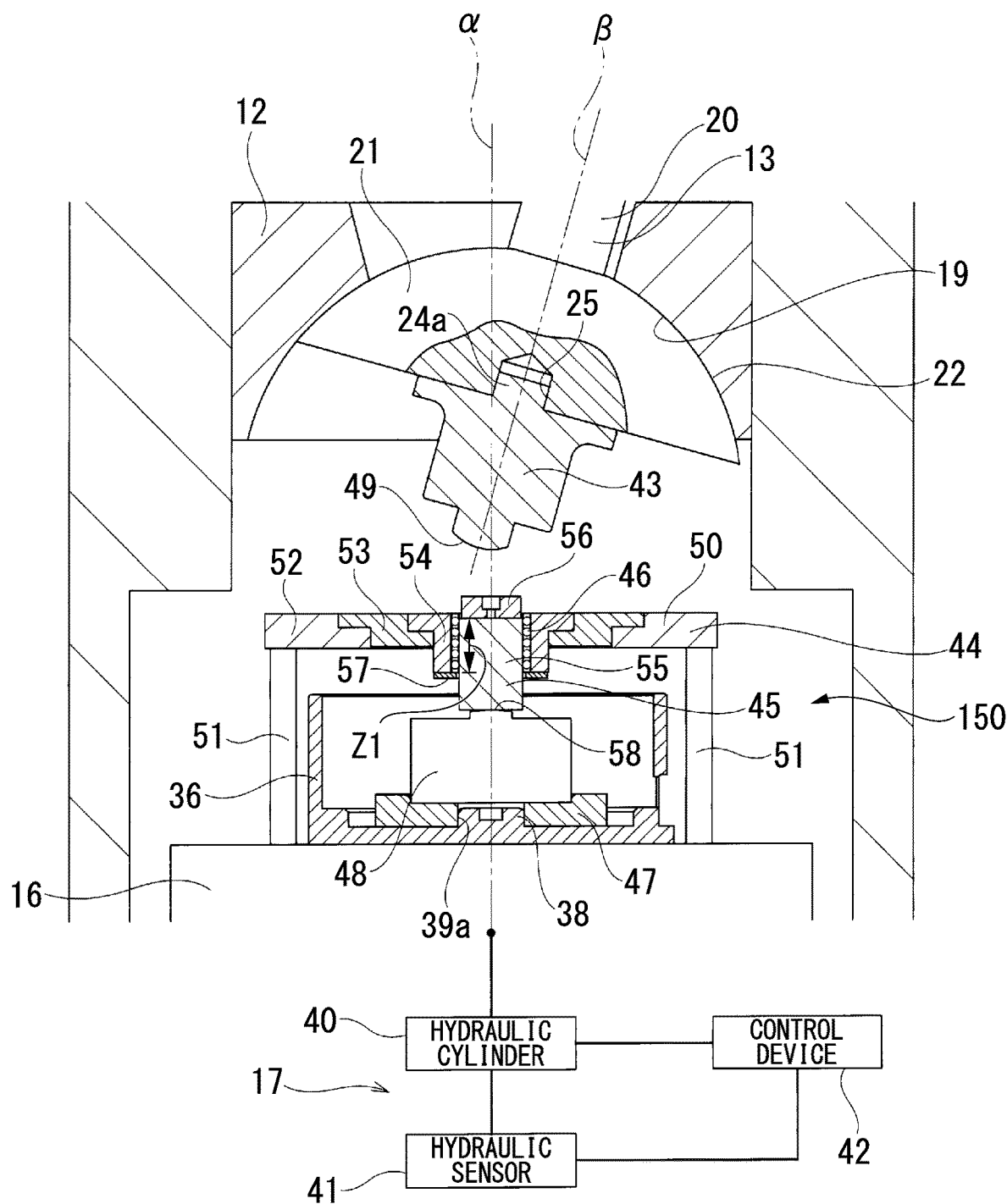

FIG. 5 is a partially enlarged cross-sectional view of FIG. 4.

Figure 6:
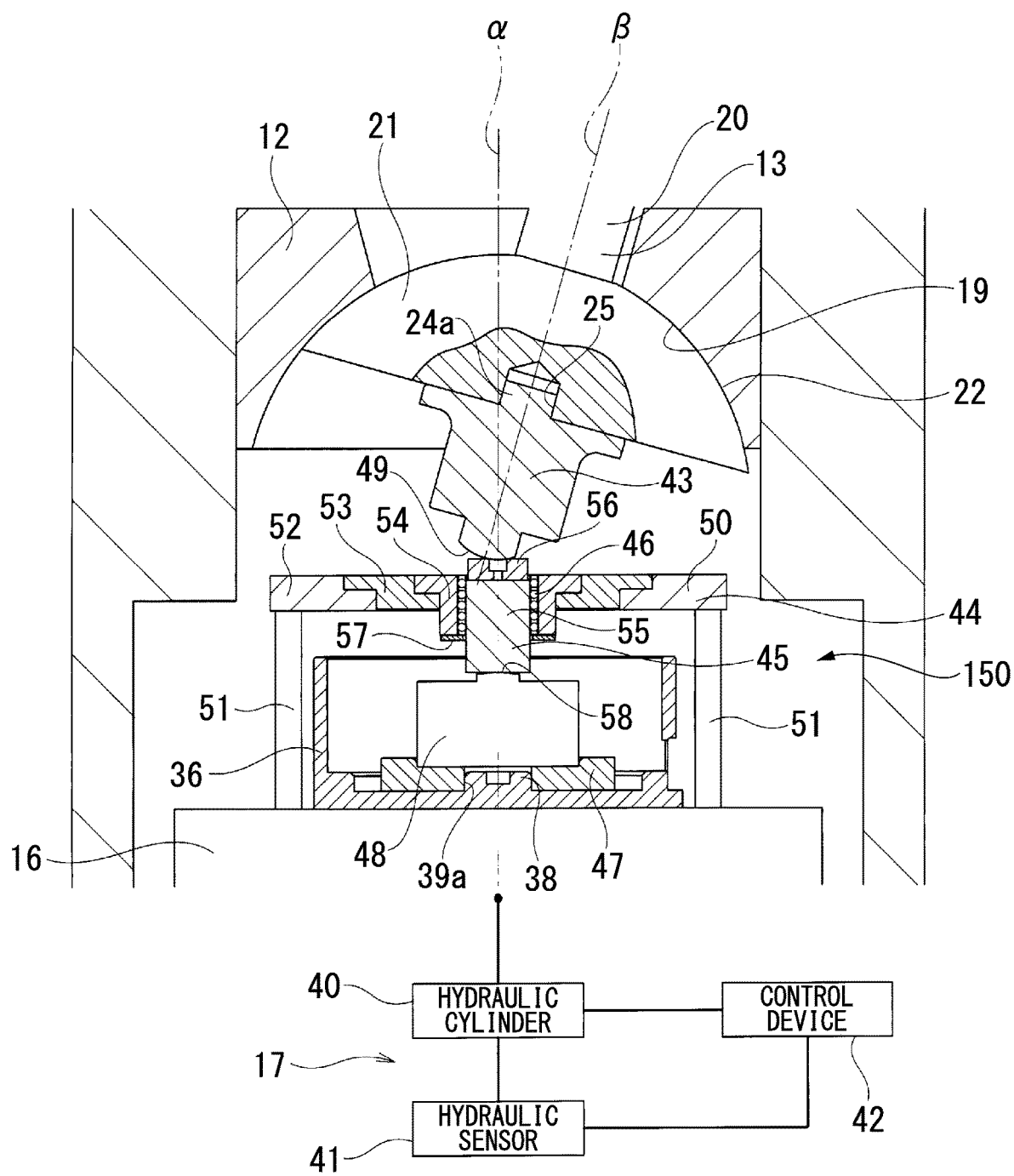

FIG. 6 is a view similar to FIG. 5 showing a state in which the measuring pressing die is pressed against the upper end surface of the measuring shaft member.

Figure 7:
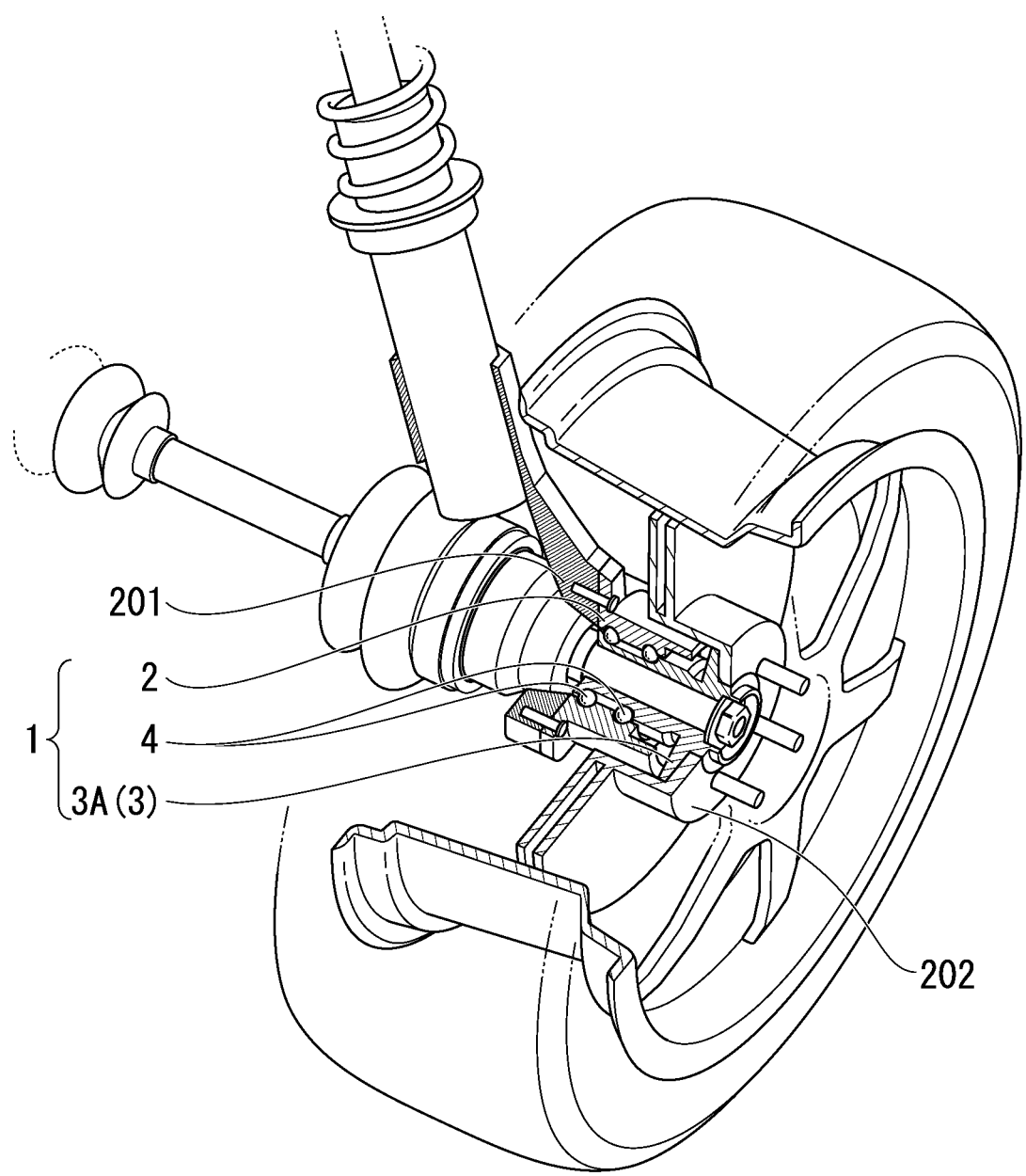

FIG. 7 is a partial schematic view of a vehicle, including a hub unit bearing (a bearing unit).

Figure 8:
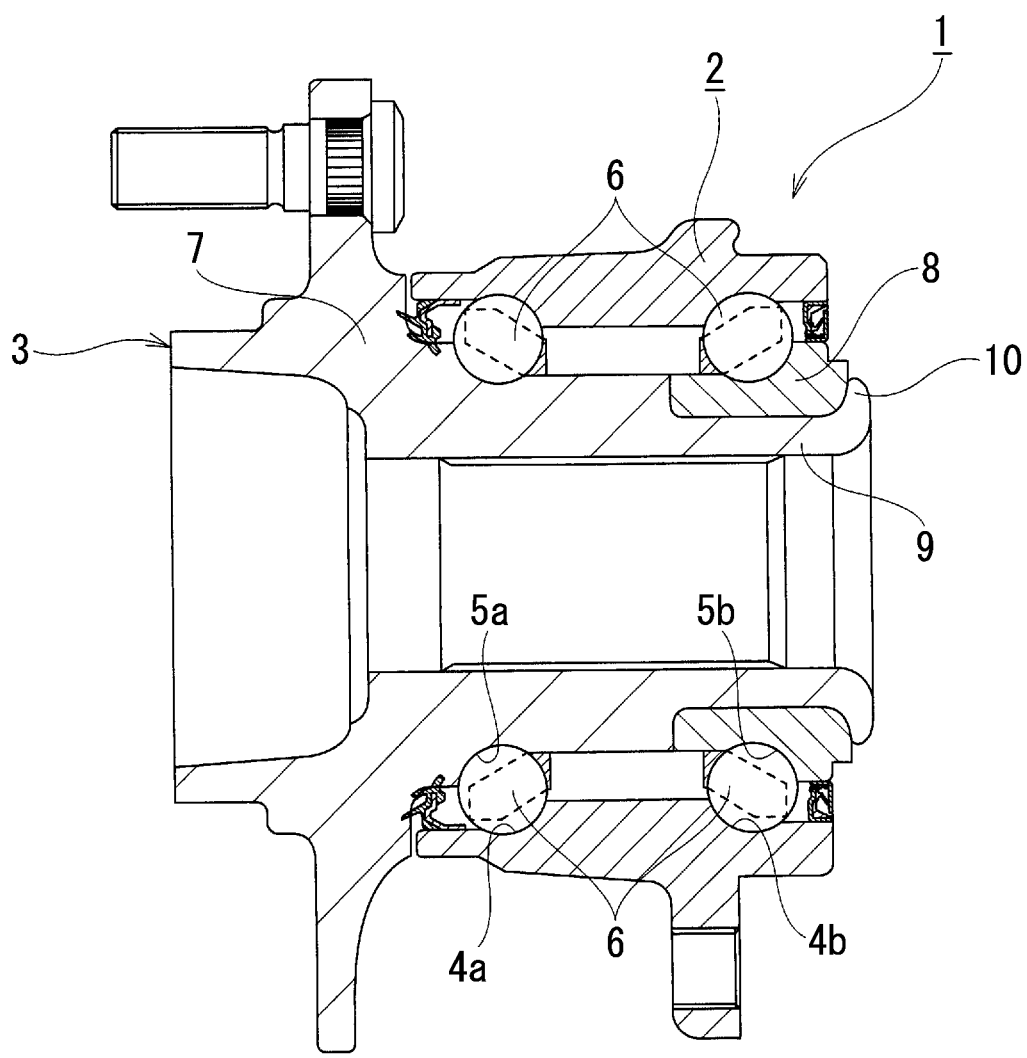

FIG. 8 is a cross-sectional view showing one example of the hub unit bearing.

DESCRIPTION OF EMBODIMENTS

Embodiments of the present invention will be described using FIGS. 1 to 8.

FIG. 7 is a partial schematic view of a vehicle 200 including a hub unit bearing (a bearing unit) 1. The present invention can be applied to any of a hub unit bearing for a driving wheel and a hub unit bearing of a driven wheel. In FIG. 7, the hub unit bearing 1 is for a driving wheel and the hub unit bearing 1 includes an outer ring 2, a hub 3, and a plurality of rolling elements 6. The outer ring 2 is fixed to a knuckle 201 of a suspension device using bolts or the like. A wheel (and a braking rotating body) 202 is fixed to a flange (a rotating flange) 3A provided on the hub 3 using bolts or the like. Furthermore, the vehicle 200 can have the same support structure as described above with respect to the hub unit bearing 1 for the driven wheel.

A rotary forging device 100 which is a target in this embodiment is, for example, used to form a caulking part 10 of the hub unit bearing 1 shown in FIG. 8.

Figure 1:
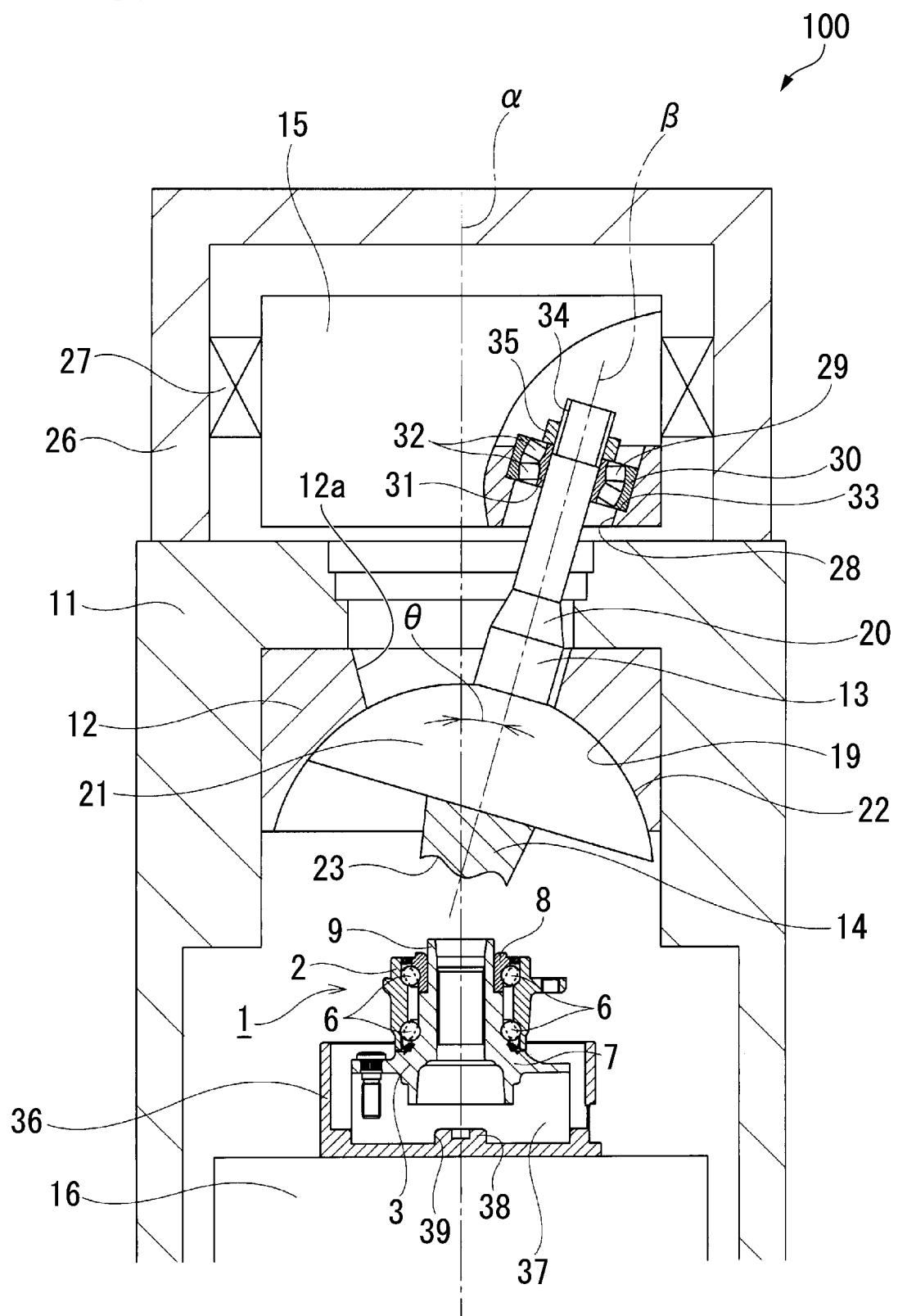
FIG. 1 is a schematic cross-sectional view showing a rotary forging device according to one example of embodiments of the present invention.

As shown in FIG. 1, the rotary forging device 100 includes a frame 11, a spherical concave seat 12, a spherical seat 13 with a shaft, a forming pressing die 14, a rotating body 15, a support table 16, a load application apparatus 17, and an outer ring drive apparatus 18.

It should be noted that, in the following description of this embodiment, an upward/downward direction refers to the upward downward directions in FIGS. 1 to 6. Here, the upward/downward direction in FIGS. 1 to 6 does not necessarily coincide with an upward/downward direction at the time of processing.

The frame 11 constitutes an outer form of the rotary forging device 100 and has a reference axis α disposed in the upward/downward direction (a vertical direction). A head case 26 which constitutes an outer form together with the frame 11 is fixed to an upper surface of the frame 11.

The spherical concave seal (a spherical concave seat and a concave seat body) 12 has a hole portion 12*a* having a swing shaft 20 of the spherical seat 13 with a shaft disposed therein and is constituted in an annular shape as a whole. The spherical concave seat 12 is fixed to an upper inside of the frame 11. The spherical concave seat 12 has a spherical concave portion (a concave surface, a spherical surface, and a spherical concave surface) 19 having a central axis coaxial with the reference axis α. The spherical concave portion 19 is an axially lower surface and is disposed facing downward. The spherical concave portion 19 has an opening corresponding to the hole portion 12*a* and is constituted in an annular shape (a circular annular shape) as a whole. The spherical concave portion 19 has a surface which smoothly extends in a circumferential direction about a central axis thereof over the entire circumference.

The spherical seat 13 with a shaft (a swing member and a swing body) has the swing shaft (a shaft) 20 and a spherical convex surface seat (a spherical convex seat and a convex seat body) 21 coaxially fixed to a lower aid portion of the swing shaft 20. A central axis of the swing shaft 20 is coaxial with a central axis of the spherical convex surface seat 21. The spherical convex surface seat 21 has a spherical convex portion (a convex surface, a spherical surface, and a spherical convex surface) 22 constituted in a partially spherical shape. The spherical convex portion 22 has an outer diameter dimension larger than that of the swing shaft 20. The spherical convex portion 22 is an axially upper surface and is disposed facing upward. The spherical convex portion 22 is constituted in an annular shape (a circular annular shape) as a whole. The spherical convex portion 22 has a surface which smoothly extends in a circumferential direction about a central axis thereof over the entire circumference.

Such a spherical seat 13 with a shaft is disposed inside the frame 11 and the head case 26. The spherical seat 13 with a shaft is disposed in a state in which an axis of rotation β that is a central axis thereof is inclined by a predetermined angle θ with respect to the reference axis α. The spherical convex surface seat 21 is spherically fitted to the spherical concave seat 12. The spherical alignment of the spherical convex portion 22 with respect to the spherical concave portion 19 allows the spherical seat 13 with a shaft to rotate (swingingly rotate) about the reference axis α and to revolve about the axis of rotation β. In one example, a predetermined angle θ for caulking can be set to 10 degrees or more and 30 degrees or less or 15 degrees or more (for example, 15 degrees or more and 30 degrees or less). In one example, a predetermined angle θ can be 15 degrees as a swing angle that is an angle of the axis of rotation (β) with respect to the reference axis (α). In another example, a predetermined angle θ can be 5, 10, 12, 14, 16, 18, 20, 25, 30, or 35 degrees.

The forming pressing die 14 is attached to an axially lower portion of the spherical convex surface seat 21 coaxially with the spherical seal 13 with a shaft and in an attachable and detachable manner. The forming pressing die 14 has a surface portion to be processed 23 on the axially lower surface. In one example, the surface portion to be processed 23 has a circular annular shape. The coaxiality of the forming pressing die 14 with respect to the spherical seat 13 with a shaft is achieved by internally fitting a convex portion (a boss portion) 24 provided at a central portion of an upper surface of the forming pressing die 14 into a concave portion 25 provided at a central portion of a lower surface of the spherical convex surface seat 21 without rattling.

The rotating body 15 is supported inside the head case 26 by a bearing device 27 to be able to rotate about the reference axis α. The rotating body 15 can be rotationally driven by a rotating body drive apparatus having an electric motor for the rotating body (not shown) as a drive source. In one example, the rotating body 15 has one holding hole 28 inclined by the same angle θ as the axis of rotation β of the swing shaft 20 with respect to the reference axis α in an circumferential direction of a radially outer portion thereof. An axially upper portion of the swing shaft 20 is rotatably supported inside the holding hole 28 via a rolling bearing 29. In this state, the swing shaft 20 is prevented from being displaced axially downward with respect to the holding hole 28, that is, falling off from the holding hole 28.

In this embodiment, as the rolling bearing 29, something having an axial load support ability in addition to a radial load support ability, specifically, an self-aligning roller bearing is used. In the self-aligning roller bearing, a plurality of spherical milers 32 that are rolling elements are disposed between an inner circumferential surface of an outer ring 30 and an outer circumferential surface of an inner ring 31. The self-aligning roller bearing can support a radial load and an axial load acting between the outer ring 30 and the inner ring 31. Furthermore, even when central axes of the outer ring 30 and the inner ring 31 are inclined, a characteristic in which the spherical rollers 32 can be smoothly rolled between the inner circumferential surface of the outer ring 30 and the outer circumferential surface of the inner ring 31, that is, a self-alignment property is provided. Since various kinds of more specific constitutions of such a self-aligning roller bearing are known in the related art, a description thereof will be omitted. It should be noted that a deep groove ball bearing, an angular contact ball bearing, and the like can also be used as the rolling bearing 29.

In one example, the holding hole 28 is a stepped hole configured by connecting a large diameter hole on an upper side in an axial direction thereof to a small diameter hole on a lower side in the axial direction thereof via a step surface 33 facing the upper side in the axial direction thereof. The outer ring 30 is internally fitted into the large diameter hole of the holding hole 28 and an axially lower end surface of the outer ring 30 is in contact with the step surface 33 of the holding hole 28. Thus, the outer ring 30 is prevented from being displaced downward in the axial direction with respect to the holding hole 28. Furthermore, the axially upper portion of the swing shaft 20 is internally fitted (inserted) to be able to be relatively displaced in the axial direction with respect to the inner ring 31. A nut 35 screwed to a male screw portion 34 provided in the axially upper portion of the swing shaft 20 is in contact with an axially upper end surface of the inner ring 31. Thus, the swing shaft 20 is prevented from being displaced downward in the axial direction with respect to the inner ring 31. By adopting such a constitution, the swing shaft 20 is prevented from being displaced downward in the axial direction with respect to the holding hole 28.

By changing a positional relationship between the spherical convex portion 22 and the spherical concave portion 19 concerning an axial position of the swing shaft 20 by adjusting a screwing position (an amount of screwing) of the nut 35 with respect to the male screw portion 34, a gap (an engagement margin) present in a spherical surface engaging portion between the spherical convex portion 22 and the spherical concave portion 19 is adjusted and an appropriate gap can be obtained. It should be noted that, in this embodiment, the spherical seat 13 with a shaft, the rotating body 15, the bearing device 27, and the rolling bearing 29 correspond to a pressing die support part.

The support table 16 is disposed inside the frame 11 and below the forming pressing die 14. Furthermore, the support table 16 is provided to be able to move in the upward/downward direction along the reference axis α with respect to the frame 11. A receiving die (a holder) 36 is fixed to an upper surface of the support table 16. In one example, the receiving die 36 has a bottomed cylindrical shape with an open upper end and is disposed coaxially with the reference axis α. The receiving die 36 can hold a workpiece coaxially via a work adapter 37. The work adapter 37 is coaxial with the receiving die 36 in an attachable and detachable manner. The work adapter 37 is a jig having a shape corresponding to a type of workpiece and can hold a workpiece coaxially. The coaxiality of the work adapter 37 with respect to the receiving die 36 can be achieved by internally fitting a convex portion (a boss portion) 38 provided on a central portion of an upper surface of a bottom plate portion in the receiving die 36 into the concave portion 39 provided in a central portion of a lower surface in the work adapter 37 without rattling.

The load application apparatus 17 (shown in block diagrams only in FIGS. 2, 5, and 6) is configured to move the support table 16 in the upward/downward direction. With the movement of the support table 16, the forming pressing die 14 (and a measuring pressing die 43 which will be described later) is pressed against an object to be pressed supported by the support table 16 and a load in a direction of the reference axis α is applied to the object to be pressed. The load application apparatus 17 includes a hydraulic cylinder 40, a hydraulic sensor 41, and a control device 42.

The hydraulic cylinder 40 includes a pair of hydraulic chambers and a piston provided between the pair of hydraulic chambers. In the hydraulic cylinder 40, the piston moves on the basis of a differential pressure between the pair of hydraulic chambers. With the movement of the piston, the support table 16 moves in the upward/downward direction along the reference axis α. The hydraulic sensor 41 measures a differential pressure between the pair of hydraulic chambers. The control device 42 controls a position of the support table 16 in the upward/downward direction and a load applied to the object to be pressed in the direction of the reference axis α by controlling a differential pressure between the pair of hydraulic chambers. The differential pressure (the load) between the pair of hydraulic chambers using the control device 42 is controlled while confirming (feed backing) the differential pressure measured by the hydraulic sensor 41. Furthermore, a set value of a load controlled by the control device 42 is defined by a differential pressure between a pair of hydraulic chambers×an area of a piston×a coefficient. The set value of the load is displayed on a display part of the control device 42 so that an operator or the like can confirm the set value. It should be noted that, although the coefficient is basically 1, the coefficient can be appropriately adjusted (changed) through calibration work which will be described later.

The outer ring drive apparatus 18 (shown in the block diagram only in FIG. 2) is supported by the support table 16. The outer ring drive apparatus 18 is used to rotationally drive the outer ring 2 with respect to the hub 3 using an electric motor for the outer ring as a drive source when the caulking part 10 of the hub unit bearing 1 is formed.

In this embodiment, the control device 42 constitutes not only the load application apparatus 17 but also a rotating body drive apparatus (not shown) configured to rotationally drive the rotating body 15 and a part of the outer ring drive apparatus 18 and is constituted to perform drive control on these apparatus.

Figure 2:
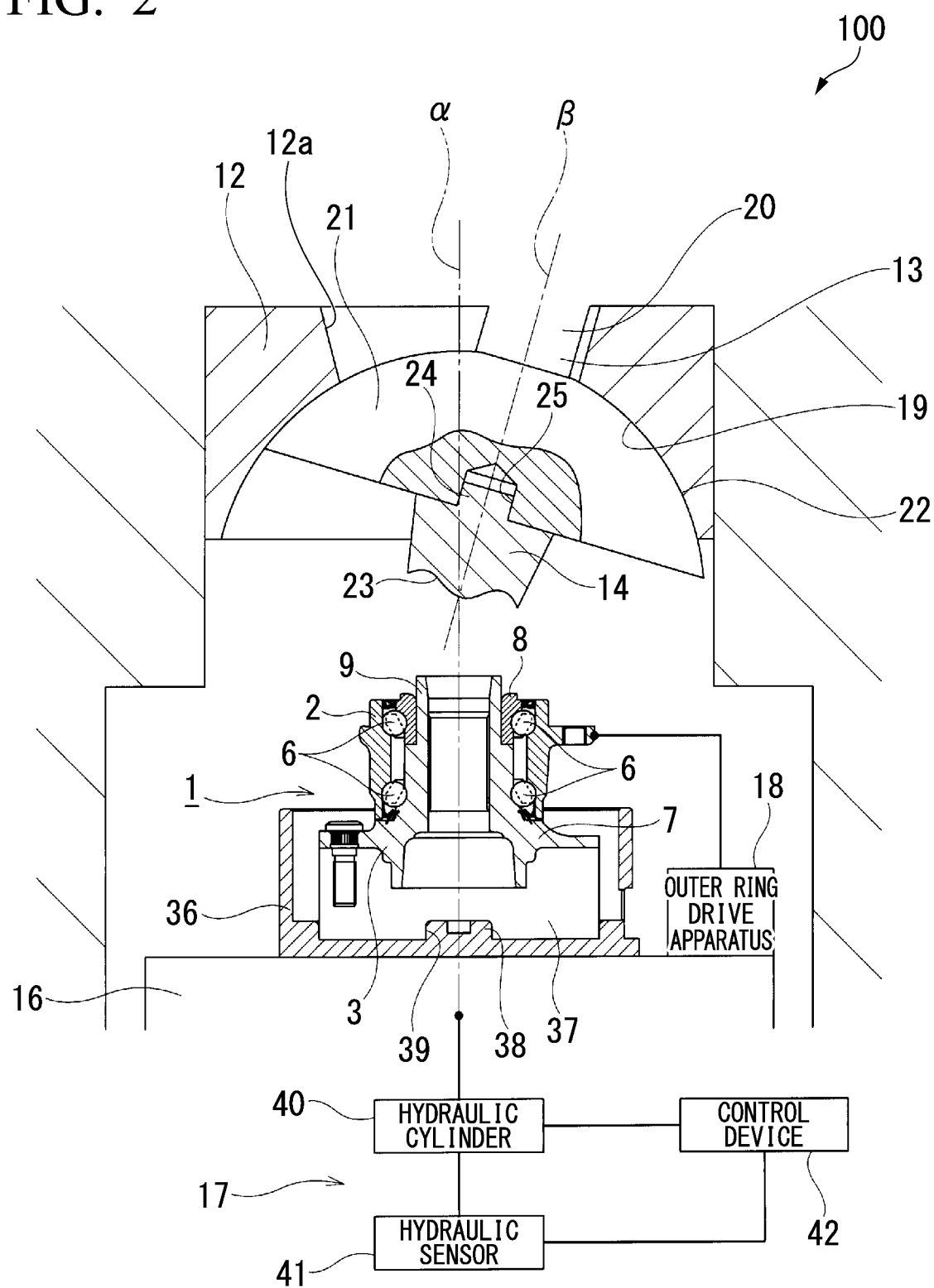
FIG. 2 is a partially enlarged cross-sectional view of FIG. 1.

In the rotary forging device 100 in this embodiment, when the caulking part 10 is formed at an axially inner end portion of a hub ring 7, as shown in FIGS. 1 and 2, the hub ring 7 that is a workpiece and is an object to be pressed is held coaxially with the receiving die 36 (via (the work adapter 37) in a state in which the hub ring 7 before the caulking part 10 is formed and other constituent elements constituting the hub unit bearing 1 are assembled. It should be noted that, in this state, the hub ring 7 is supported by the support table 16 via the work adapter 37 and the receiving die 36. Furthermore, in this state, the outer ring 2 is rotated relative to the hub 3 using the outer ring drive apparatus 18. On the basis of the rotation of the rotating body 15, the spherical seat 13 with a shaft and the forming pressing die 14 swingingly rotate about the reference axis α. In this state, the support table 16 moves upward, and as shown in part (a) of FIG. 3, the surface portion to be processed 23 of the forming pressing die 14 is pressed against a cylindrical part 9 of the hub ring 7. Thus, processing forces directed downward in the upward/downward direction and outward in the radial direction are applied from the forming pressing die 14 to the cylindrical part 9. Furthermore, an application portion (a processing position) of a processing force changes continuously in a circumferential direction. Thus, as shown in FIG. 3(a) to FIG. 3(b), the cylindrical part 9 gradually plastically deforms outward in the radial direction to form the caulking part 10 and an axially inner end surface of the inner ring 8 is suppressed by the caulking part 10.

Thus, when the caulking part 10 is formed, the forming pressing die 14 swingingly rotates as described above while rotating (revolving) about the axis of rotation β on the basis of a frictional force acting on a contact portion between the forming pressing die 14 and the cylindrical part 9. That is to say, the contact of the forming pressing die 14 with respect to the cylindrical part 9 is a rolling contact. For this reason, the wear and the heat generation at a contact portion can be sufficiently minimized. Furthermore, the processing reaction force applied from the cylindrical part 9 to the forming pressing die 14 can be efficiently supported by the spherical concave seat 12.

Incidentally, a load deviation may occur in the rotary forging device 100 in this embodiment as described above in some cases. This is caused by variations of the accuracy of the hydraulic sensor 41, the sliding resistance of the piston of the hydraulic cylinder 40, the weight of the support table 16, or the like or is caused by changes with the passage of time thereof. That is to say, a set value of a load of the load application apparatus 17 (a set value of a load controlled by the control device 42 and a display value of a load displayed on the display part of the control device 42) deviates from an actual load in the direction of the reference axis α applied to the object to be pressed. For this reason, in the rotary forging device 100 in this embodiment, in view of securing the processing accuracy of the workpiece, it is desirable to calibrate a set value (a display value) of a load of the load application apparatus 17 at the time of shipment, maintenance, or the like.

Therefore, a dynamic load measuring device 150 will be described below using FIGS. 4 to 6. The dynamic load measuring device 150 is used to calibrate a set value (a display value) of a load of the load application apparatus 17, that is, to perform a method of calibrating the rotary forging device 100 of this embodiment. It should be noted that FIGS. 4 to 6 show a state in which the dynamic load measuring device 150 is assembled to the rotary forging device 100.

The dynamic load measuring device 150 includes the measuring pressing die 43, a guide stand 44, a measuring shaft member 45 that is an object to be pressed, a linear motion ball bearing (a linear guide) 46, a load cell adaptor 47, and a load cell 48.

The measuring pressing die (a pressing die and an inspection die) 43 is attached to the spherical convex surface seat 21 instead of the forming pressing die (the processing die). The measuring pressing die 43 is attached to an axially lower portion of the spherical convex surface seat 21 from which the forming pressing die 14 has been removed coaxially with the spherical seat 13 with a shall and in an attachable and detachable manner. The coaxiality of the measuring pressing die 43 with respect to the spherical seat 13 with a shaft is achieved by internally fitting a convex portion (a boss portion) 24a provided at a central portion of an upper surface of the measuring pressing die 43 into the concave portion 25 provided at a central portion of a lower surface of the spherical convex surface seat 21 without rattling. In one example, the measuring pressing die 43 has a spherical convex shape (a spherical convex surface) in which a distal end portion 49 that is an axially lower end portion has a center of curvature above the reference axis α. In this embodiment, the measuring pressing die 43 is made of steel and the distal end portion 49 is subjected to hardening heal treatment.

The guide stand 44 is fixed to the upper surface of the support table 16. The guide stand 44 includes a top plate part 50 disposed horizontally above the receiving die 36 and a plurality of leg parts 51 which support a plurality of portions of an outer circumferential portion of the top plate part 50 in an circumferential direction thereof with respect to the upper surface of the support table 16. The top plate part 50 includes a circular-ring-shaped outer circumferential plate part 52 constituting an outer circumferential portion thereof, a circular-ring-shaped bush support plate pan 53 internally supported by the outer circumferential plate pan 52, and a cylindrical bush 54 internally fitted into and supported by the bush support plate part 53. The bush 54 is disposed coaxially with the reference axis α. Furthermore, the bush 54 is made of steel and is subjected to hardening heat treatment to improve the wear resistance thereof.

The measuring shall member 45 is constituted in a circular columnar shape as a whole. The measuring shaft member 45 is disposed coaxially with the reference axis α via the linear motion ball bearing 46 inside the bush 54 in the radial direction thereof and is linearly guided in the direction of the reference axis α. The measuring shaft member 45 is constituted by connecting and fixing a main body part 55 which constitutes most except for an upper end portion thereof to a buffer part 56 which constitutes the upper end portion thereof. The main body part 55 is made of steel, is constituted in a circular columnar shape, and is subjected to hardening heat treatment to improve the wear resistance. The buffer part 56 is made of steel, is constituted in a cylindrical short shape, and is in a raw state without being subjected to hardening heat treatment. That is to say, the buffer part 56 is constituted of a metal softer than that of the distal end portion 49 of the measuring pressing die 43. The measuring shaft member 45 has an outer circumferential surface having an outer diameter which is substantially the same as a diameter (a processing diameter) corresponding to a caulking part that is an object to be processed. For example, a ratio of the outer diameter of the outer circumferential surface to the processing diameter can be about 0.5, 0.8, 1.0, 1.2, 1.4, 1.6, 1.8, 2.0, or more.

The linear motion ball bearing 46 has a plurality of balls which are disposed to freely rotate and a cylindrical holder (a ball retainer) which holds these balls between a cylindrical inner circumferential surface of the bush 54 and a cylindrical outer circumferential surface of the main body part 55 constituting the measuring shaft member 45. The linear motion ball bearing 46 is prevented from falling from the inner side of the bush 54 in the radial direction thereof using a circular-ring-shaped suppression plate 57 fixed to a lower end surface of the bush 54. The measuring shaft member 45 is linearly guided in the direction of the reference axis α using the linear motion ball bearing 46 so that the displacement of the measuring shaft member 45 in a direction orthogonal to the reference axis α and the inclination of the measuring shall member 45 with respect to the reference axis α are prevented. The linear motion ball bearing 46 is constituted to continuously surround an outer circumferential surface of the measuring shaft member 45 over the entire circumference. The linear motion ball bearing 46 can support a force from the outer circumferential surface of the measuring shall member 45 over the entire circumference. An axial support length (a distance of a support section, in the axial direction) Z1 (FIG. 5) of the linear motion ball bearing (the linear guide) 46 with respect to the outer circumferential surface of the measuring shaft member 45 is appropriately set. A ratio of the axial support length Z1 to the processing diameter can be about 0.5, 0.8, 1.0, 1.2, 1.4, 1.6, 1.8, 2.0, or more.

The load cell adaptor 47 is attached above a bottom plate portion of the receiving die 36 from which the work adapter 37 has been removed coaxially with the receiving die 36 and in an attachable and detachable manner. The load cell adaptor 47 can hold the load cell 48 coaxially. The coaxiality of the load cell adaptor 47 with respect to the receiving die 36 is achieved by internally fitting a convex portion (a boss portion) 38 provided at a central portion of an upper surface of the bottom plate portion of the receiving die 36 into the concave portion 39a provided at a central portion of a lower surface of the load cell adaptor 47 without rattling.

The load cell 48 is coaxially held above the load cell adaptor 47. Therefore, the load cell 48 is disposed coaxially with the reference axis α. The load cell 48 has an input portion 58 having a spherical convex shape in which an upper surface of a central portion in the radial direction thereof protrudes further upward than the peripheral portion. The load cell 48 can measure a load in the direction of the reference axis α input from the input portion 58. A lower surface (a flat surface orthogonal to the reference axis α) of the main body part 55 constituting the measuring shall member 45 is in contact with a central portion of the input portion 58. Therefore, the load cell 48 can measure a load in the direction of the reference axis α input from the measuring shaft member 45. Such a load cell 48 generally includes a strain generating body (not shown) elastically deforming due to a load in the direction of the reference axis α input front the input portion 58 and a strain gauge (not shown) adhered to the strain generating body. The load cell 48 has a constitution in which an amount of elastic deformation of the strain generating body is converted into a voltage using the strain gauge and the load is measured. It should be noted that the measuring shaft member 45 is supported by the support table 16 via the load cell 48, the load cell adaptor 47, and the receiving die 36. In one example, the load cell 48 has a short circular columnar shape. In other examples, the load cell 48 can have other shapes.

A method fix calibrating the rotary forging device 100 in this embodiment will be described below. First, as shown in FIGS. 4 and 5, the dynamic load measuring device 150 is assembled to the rotary forging device 100. The load application apparatus 17 moves the support table 16 upward while the spherical seat 13 with a shaft and the measuring pressing die 43 are swung and rotated about the reference axis α on the basis of the rotation of the rotating body 15. Then, as shown in FIG. 6, the distal end portion 49 of the measuring pressing die 43 comes in contact with an upper end surface of the measuring shaft member 45 and starts pressing the measuring pressing die 43. At the same time, the measuring pressing die 43 starts the revolution thereof about the axis of rotation β. A force (an actual load) by which the measuring pressing die 43 presses the measuring shaft member 45 using the load application apparatus 17 is input from the measuring shaft member 45 to the input portion 58 of the load cell 48.

Here, in order to accurately measure, using the load cell 48, the force by which measuring pressing die 43 presses the measuring shaft member 4 using the load application apparatus 17 as a load in the direction of the reference axis α, it is necessary to input the load in the direction of the reference axis α from the measuring shaft member 45 to the central portion of the input portion 58 of the load cell 48. In this regard, in this embodiment, a lower end surface of the measuring shaft member 45 is in contact with the central portion of the input portion 58 of the load cell 48. Furthermore, the measuring shaft member 45 is guided to be linearly moved using the linear motion ball bearing 46 in the direction of the reference axis α. For this reason, the lower end surface of the measuring shaft member 45 which has been guided to be linearly moved can press the central portion of the input portion 58 of the load cell 48 substantially in the direction of the reference axis α even if an offset load is input from the distal end portion 49 of the measuring pressing die 43 to, the upper end surface of the measuring shaft member 45. Therefore, the load application apparatus 17 can accurately measure the force by which the measuring pressing die 43 presses the measuring shaft member 45 as a load in the direction of the reference axis α using the had cell 48.

Also, in this embodiment, the distal end portion 49 of the measuring pressing die 43 is formed to have a spherical convex shape having a center of curvature above the reference axis α. For this reason, the distal end portion 49 can press the central portion of the upper end surface of the measuring shaft member 45. Therefore, it is difficult for an offset load to be input from the measuring pressing die 43 to the measuring shaft member 45. In addition, it is difficult for an offset load to be input from the measuring shaft member 45 to the input portion 58 of the load cell 48. Accordingly, the measurement accuracy of a load in the direction of the reference axis α using the load cell 48 can be improved.

Also, in this embodiment, the upper end portion of the measuring shaft member 45 is the buffer part 56 made of a metal softer than that of the distal end portion 49 of the measuring pressing die 43. For this reason, when the distal end portion 49 of the measuring pressing die 43 starts pressing the upper end surface of the buffer part 56, the deformation of the upper end surface of the buffer part 56 starts. After that, the upper end surface of the buffer part 56 has a shape in which the upper end surface matches (spherically engages with) the distal end portion 49 of the measuring pressing die 43. As a result, it is more difficult for an offset load to be input from the measuring pressing die 43 to the measuring shaft member 45. In addition, it is more difficult from an offset load to be input from the measuring shaft member 45 to the input portion 58 of the load cell 48. Accordingly, the measurement accuracy of a load in the direction of the reference axis α using the load cell 48 can be improved.

In this embodiment, for example, a load of the load application apparatus 17 is set so that a set value (a display value) of the load is a predetermined value. The distal end portion 49 of the measuring pressing die 43 is pressed against the upper end surface of the measuring shaft member 45 while the measuring pressing die 43 is swung and rotated as described above on the basis of the set load. When the load in the direction of the reference axis α input to the input portion 58 of the load cell 48 is stabilized, a measurement value of a load using the load cell 48 is confirmed.

It should be noted that the measurement value of the load using the load cell 48 may not be stable in some cases. For example, the central portion of the upper end surface of the measuring shaft member 45 cannot be pressed by the distal end portion 49 of the measuring pressing die 43 due to a manufacturing error or an assembly error of constituent elements constituting the rotary forging device 100 or the dynamic load measuring device 150. As a result, some offset load is input to the input portion 58 of the load cell 48. When the measurement value of the load using the load cell 48 is not stable, an average value when the measuring pressing die 43 is swung and rotated once is confirmed as the measurement value of the load using the load cell 48. If the confirmed measurement value of the load is different from the set value (the display value) of the load of the load application apparatus 17, the set value (the display value) of the load of the load application mean 17 is caused (calibrated) to match the confirmed measurement value of the load by adjusting a coefficient of the load application apparatus 17 (the above-mentioned coefficient multiplied when a differential pressure measured using the hydraulic sensor 41 is converted into a load). Such calibration work is repeatedly performed an set values (display values) of a plurality of loads.

For example, as shown in Table 1 which will be described later, in a case in which the set values (display values) of the plurality of loads of the load application apparatus 17 deviate from the measurement value of the load using the load cell 48, as shown in Table 2 which will be described later, a coefficient of the load application apparatus 17 is adjusted so that the set value (the display value) of the load in which the deviation has occurred matches the measurement value of the load using the load cell 48.

TABLE 1

| Set value (display value) | 0 kN | 10 kN | 50 kN | 100 kN | 150 kN | 200 kN |

TABLE 1-continued

| of load of load application apparatus | | | | | | |
|---|---|---|---|---|---|---|
| Set value of load using load cell | 0 kN | 11 kN | 55 kN | 110 kN | 165 kN | 220 kN |

TABLE 2

| Set value (display value) of load of load application apparatus | 0 kN | 10 kN | 50 kN | 100 kN | 150 kN | 200 kN |
|---|---|---|---|---|---|---|
| Set value of load using load cell | 0 kN | 10 kN | 50 kN | 100 kN | 150 kN | 200 kN |

In this embodiment, the load application apparatus 17 can accurately measure the force by which the measuring pressing die 43 presses the measuring shaft member 45 as a load in the direction of the reference axis α using the load cell 48. For this reason, the set value (the display value) of the load of the load application apparatus 17 can be accurately calibrated using the measurement value of the load using the load cell 48. Therefore, the caulking pan 10 can be finished into a desired shape using the rotary forging device 100 calibrated using the calibration method of this embodiment, and as a result, an appropriate range of a pre-pressure can be applied to the hub unit bearing 1.

It should be noted that, when the present invention is carried out, for example, something described in Japanese Patent No. 4127266 can be used as the outer ring drive apparatus 18 constituting the rotary urging device. In this case, some of the constituent elements constituting the outer ring drive apparatus 18 can be used as some (the leg parts 51, the outer circumferential plate part 52, and the bush support plate part 53) of the constituent elements constituting the guide stand 44 of the dynamic load measuring device 150.

Also, when the present invention is carried out, the rotary forging device is not limited to a type in which the support table moves in the direction of the reference axis and may be a type in which the pressing die moves in the direction of the reference axis. Furthermore, a specific structure of the pressing die support pan constituting the rotary forging device is not limited, and for example, may not include a spherical surface seat.

In one embodiment, a rotary forging device (100) includes pressing die support parts (13, 15, 27, and 29), a support table (16), and a load application apparatus (17). The pressing die support parts (13, 15, 27, and 29) can support any one selected from a forming pressing die (14) and a measuring pressing die (43) to be rotatable about a reference axis (α) and to freely rotate about an axis of rotation (β) inclined at a predetermined angle with respect to the reference axis (α). The support table (16) supports an object to be pressed disposed at a position facing a pressing die supported by the pressing die support parts (13, 15, 27, and 29) in a direction of the reference axis (α). The load application apparatus (17) applies a load to the object to be pressed in the direction of the reference axis (α) by pressing the pressing die supported by the pressing die support parts (13, 15, 27, and 29) against the object to be pressed supported by the support table on the basis of the relative movement between the pressing die support parts (13, 15, 27, and 29) and the support table (16) in the direction of the reference axis (α).

In a dynamic load measurement method of the rotary forging device (100), the measuring pressing die (43) is supported by the pressing die support parts (13, 15, 27, and 29). Furthermore, a measuring shaft member (45) that is an object to be pressed is disposed coaxially with the reference axis (α) and is linearly guided in the direction of the reference axis (α) while the measuring pressing die (43) is supported by the support table (16). After that, the load application apparatus (17) measures an actual load in the direction of the reference axis (α) applied to the measuring shaft member (45) in a state in which the measuring pressing die (43) is pressed against the measuring shall member (45) while the measuring pressing die (43) is rotated about the reference axis (α).

A dynamic load measuring device (150) of the rotary forging device (100) includes the measuring pressing die (43), the measuring shaft member (45), and a load measurement apparatus (48). The measuring pressing die (43) is supported by the pressing die support parts (13, 15, 27, and 29). The measuring shaft member (45) is disposed coaxially with the reference axis (α) and linearly guided in the direction of the reference axis (α) while supported by the support table (16). The load measurement, apparatus (48) measures the actual load in the direction of the reference axis (α) applied to the measuring shaft member (45).

A linear motion ball bearing can be used to linearly guide the measuring shaft member (45) in the direction of the reference axis (α) with respect to the support table (16).

The load measurement apparatus (48) can be a load cell disposed between the support table (16) and the measuring shaft member (45).

A distal end portion of the measuring pressing die (43) pressed against an axial end portion of the measuring shaft member (45) when the actual load is measured can be set to have a spherical convex shape having a center of curvature above the reference axis (α).

An axial end portion of the measuring shaft member (45) which can press the distal end portion of the measuring pressing die (43) when the actual load is measured can be made of a metal softer than that of the distal end portion of the measuring pressing die (43).

In one embodiment, a method for calibrating a runny forging device includes measuring the actual load using the dynamic load measurement method for the rotary forging device (100) and calibrating a set value of a load of the load application apparatus (17) using the measured actual load.

In one embodiment, a hub unit hearing (1) includes a constituent element having a caulking pan (10). In a method for manufacturing the hub unit bearing (1), the caulking part (10) is formed using a rotary forging device (100) calibrated using the method for calibrating a rotary forging device.

In one embodiment, a vehicle that is a target of a manufacturing method includes a hub unit bearing (1). In a method for manufacturing a vehicle, the hub unit bearing (1) is manufactured using the above-mentioned method for manufacturing a hub unit bearing.

REFERENCE SIGNS LIST

1 Hub unit bearing
2 Outer ring
3 Hub
4a, 4b Outer ring trajectory
5a, 5b Inner ring trajectory
6 Rolling element
7 Hub ring
8 Inner ring 9 Cylindrical part
10 Caulking part
11 Frame
12 Spherical concave seat
13 Spherical seat with shaft
14 Forming pressing die
15 Rotating body
16 Support table
17 Load application apparatus
18 Outer ring drive apparatus
19 Spherical concave portion
20 Swing shaft
21 Spherical convex surface seat
22 Spherical convex portion
23 Surface portion to be processed
24, 24a Convex portion
25 Concave portion
26 Head case
27 Bearing device
28 Holding hole
29 Rolling bearing
30 Outer ring
31 Inner ring
32 Spherical roller
33 Step surface
34 Male screw portion
35 Nut
36 Receiving die
37 Work adapter
38 Convex portion
39, 39a Concave portion
40 Hydraulic cylinder
41 Hydraulic sensor
42 Control device
43 Measuring pressing die
44 Guide stand
45 Measuring shaft member
46 Linear motion ball bearing
47 Load cell adaptor
48 Load cell
49 Distal end portion
50 Top plate part
51 Leg part
52 Outer circumferential plate part
53 Bush support plate part
54 Bush
55 Main body part
56 Buffer part
57 Suppression plate
58 Input portion
100 Rotary forging device
150 Dynamic load measuring device

The invention claimed is:

1. A dynamic load measurement method for a rotary forging device,
the rotary forging device comprising:
a forming pressing die;
a die support shaft member configured to selectively support the forming pressing die and a measuring pressing die to be rotatable about a reference axis and to freely rotate about an axis of rotation inclined at a predetermined angle with respect to the reference axis;
a support table configured to support an object to be pressed disposed at a position facing a pressing die supported by the die support shaft member in a direction of the reference axis; and
a hydraulic system having a hydraulic cylinder, a hydraulic sensor and a controller, the hydraulic cylinder being configured to apply a load in the direction of the reference axis to the object to be pressed by pressing the forming pressing die or the measuring pressing die supported by the die support shaft member against the object to be pressed supported by the support table on the basis of relative movement of the die support shaft member and the support table in the direction of the reference axis,
the method comprising
preparing the rotary forging device;
preparing the measuring pressing die;
removing the forming pressing die from the die support shaft member and supporting the measuring pressing die with the die support shaft member;
supporting the measuring pressing die by the die support shaft member, the measuring pressing die being different from the forming pressing die and having a spherical convex surface located on the reference axis,
providing a measuring shaft member as the object to be pressed by the measuring pressing die and having a circular column shape, an upper surface of the measuring shaft member being shaped to match the spherical convex surface of the measuring pressing die;
supporting the measuring shaft member by the support table and linearly guiding the measuring shaft member in the direction of the reference axis, the measuring shaft member being disposed coaxially with the reference axis, and
with using a load cell and without using the hydraulic sensor, measuring an actual load applied to the measuring shaft member along the reference axis in a state in which the spherical convex surface of the measuring pressing die is spherically engaged with and pressed against the upper surface of the measuring shaft member by the hydraulic system while the measuring pressing die is rotated about the reference axis, the load cell having an input surface with which a lower surface of the measuring shaft member is in contact, the input surface of the load cell being located directly on the reference axis and the reference axis passing through the spherical convex surface of the measuring pressing die and through a substantial contact area of the input surface of the load cell with the lower surface of the measuring shaft member when the load cell receives the actual load.

2. The dynamic load measurement method according to claim 1, wherein, in the measuring the actual load applied to the measuring shaft member, the measuring shaft member linearly moves and the lower surface of the measuring shaft member presses the substantial contact area of the input surface of the load cell, the substantial contact area of the input surface corresponding to a central portion thereof.

3. The dynamic load measurement method according to claim 2, wherein the input surface has a spherical convex shape, and the lower surface of the measuring shaft member is a flat surface orthogonal to the reference axis and in contact with the central portion of the input surface.

4. The dynamic load measurement method according to claim 1, wherein the measuring shaft member is linearly guided by the in the direction of the reference axis by a motion ball bearing comprising a plurality of balls about an outer surface of the measuring shaft member disposed to rotate along the reference axis.

5. A rotary forging device comprising:
a forming pressing die;
a die support shaft member configured to selectively support the forming pressing die and a measuring pressing die to be rotatable about a reference axis and to freely rotate about an axis of rotation inclined at a predetermined angle with respect to the reference axis;
a support table configured to support an object to be pressed disposed at a position facing a pressing die supported by the die support shaft member in a direction of the reference axis;
a hydraulic system having a hydraulic cylinder, a hydraulic sensor and a controller, the hydraulic cylinder being configured to apply a load along the reference axis to the object to be pressed by pressing the forming pressing die or the measuring pressing die supported by the die support shaft member against the object to be pressed supported by the support table on the basis of relative movement of the die support shaft member and the support table in the direction of the reference axis; and
a dynamic load measuring device,
wherein the dynamic load measuring includes:
the measuring pressing die supported by the die support shaft member, the measuring pressing die being different from the forming pressing die and having a spherical convex surface located on the reference axis;
a measuring shaft member having a circular column shape that is the object to be pressed disposed coaxially with the reference axis and linearly guided in the direction of the reference axis while supported by the support table, an upper surface of the measuring shaft member shaped to match the spherical convex surface of the measuring pressing die; and
a load cell having an input surface with which a lower surface of the measuring shaft member is in contact,
wherein, in a first mode in which the forming pressing die is supported by the die support shaft member, the forming pressing die is configured to process a workpiece into a predetermined shape,
wherein, in a second mode in which the measuring pressing die is supported by the die support shaft member in place of the forming pressing die, an actual load is measured, without using a hydraulic sensor, along the reference axis applied to the measuring shaft member, and
wherein, in the second mode, the input surface of the load cell receives the actual load while the input surface of the load cell is coaxial with the reference axis and the reference axis passes through the spherical convex surface of the measuring pressing die and through a substantial contact area of the input surface of the load cell with the lower surface of the measuring shaft member and while the spherical convex surface of the measuring pressing die is spherically engaged with and pressed against the upper surface of the measuring shaft member.

6. The rotary forging device according to claim 5, comprising:
a linear motion ball bearing configured to linearly guide the measuring shaft member in the direction of the reference axis with respect to the support table.

7. The rotary forging device according to claim 5, wherein the load cell is a load cell disposed between the support table and the measuring shaft member.

8. The rotary forging device according to claim 5, wherein an axial end portion of the measuring shaft member pressed against a distal end portion of the measuring pressing die when the actual load is measured is made of a metal softer than that of the distal end portion of the measuring pressing die.

9. The rotary forging device of claim 5, wherein the input surface of the load cell has a spherical convex shape, the substantial contact area of the input surface corresponding to a central portion thereof,
wherein the lower surface of the measuring shaft member is a flat surface orthogonal to the reference axis.

10. A method for calibrating a rotary forging device, the method comprising:
measuring an actual load using the dynamic load measurement method for a rotary forging device according to claim 1 and
calibrating a set value of a load of the hydraulic system using the measured actual load.

11. A method for manufacturing a hub unit bearing which includes a constituent element having a caulking part, the method comprising:
forming the caulking part using a rotary forging device calibrated using the method for calibrating a rotary forging device according to claim 10.

12. A method for manufacturing a vehicle which includes a hub unit bearing, comprising:
manufacturing the hub unit bearing using the method for manufacturing a hub unit bearing according to claim 11.

* * * * *